United States Patent [19]

Maruko

[11] 3,888,955

[45] June 10, 1975

[54] CONNECTION DEVICE

[76] Inventor: Saburo Maruko, 1663 Seya-machi, Seya-ku, Yokohama, Japan

[22] Filed: Mar. 21, 1974

[21] Appl. No.: 453,348

[30] Foreign Application Priority Data
Apr. 4, 1973   Japan.............................. 48-37762

[52] U.S. Cl............. 261/99; 261/104; 261/DIG. 9; 261/DIG. 54
[51] Int. Cl............................................. B01f 3/04
[58] Field of Search . 261/99, 104, DIG. 54, DIG. 9; 202/227, 228

[56] References Cited
UNITED STATES PATENTS

| | | | |
|---|---|---|---|
| 2,442,898 | 6/1948 | Maguire...................... | 261/DIG. 54 |
| 3,212,761 | 10/1965 | Willett........................ | 261/DIG. 54 |
| 3,222,136 | 12/1965 | Hess et al. .................. | 261/DIG. 54 |
| 3,262,685 | 7/1966 | Pike et al..................... | 261/DIG. 54 |
| 3,583,635 | 6/1971 | Lemelson.......................... | 261/99 X |
| 3,758,081 | 9/1973 | Prudhon ..................... | 261/DIG. 54 |

Primary Examiner—Tim R. Miles
Assistant Examiner—Richard L. Chiesa
Attorney, Agent, or Firm—Hammond & Littell

[57] ABSTRACT

A connection device for connecting between the flue conduit extending from a combustion furnace or reactor and a washing-absorption tower which concurrently serves as high temperature gas quenching means comprising a double-walled structure which includes an inner porous cylinder and an outer impervious cylinder surrounding the inner cylinder in a peripherally spaced relationship thereto, a cooling liquid inlet means in said outer cylinder, a water-proof porous annular plate member provided between said flue conduit and double-walled cylindrical structure and gas inlet means adjacent to said water-proof porous annular plate member.

13 Claims, 2 Drawing Figures

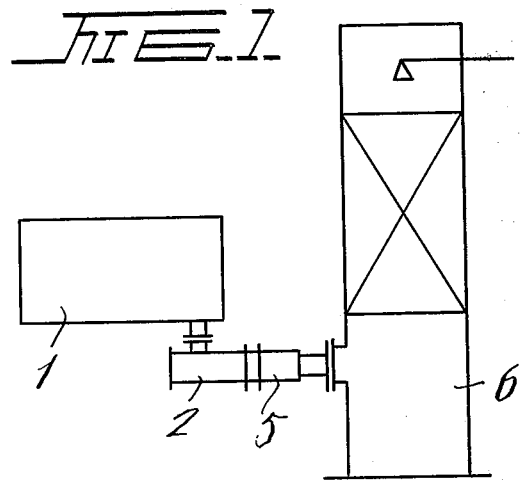
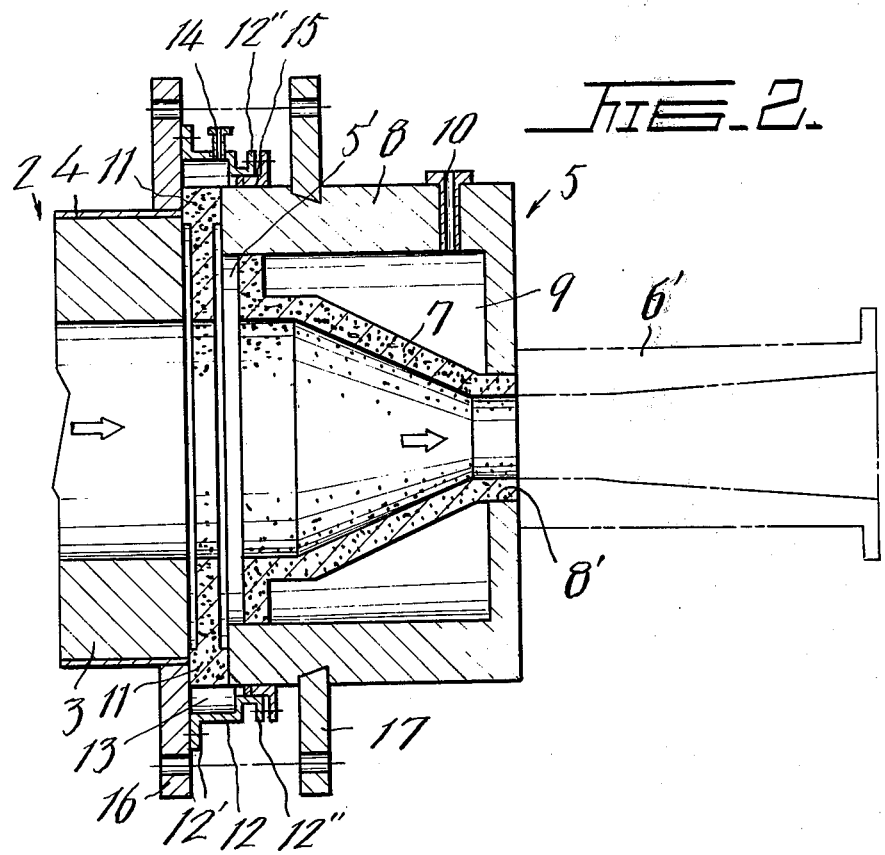

CONNECTION DEVICE

BACKGROUND OF THE INVENTION

This invention relates to a connection device for connecting between the flue conduit extending from a combustion furnace or reactor and a washing-absorption tower and more particularly, to such a connection device which concurrently serves as high temperature gas quenching means.

Gas generated in a combustion furnace or reactor is generally discharged at a substantially high temperature over 1000°C whereas the gas is required to be at a relatively low temperature below 100°C at the inlet of a washing-absorption tower. Therefore, a connection device which connects between the flue conduit extending from a combustion furnace or reactor and a washing-absorption tower and which concurrently serves as high temperature gas quenching means is required to be formed of a material which is capable of accommodating a substantial change in the temperature of the flue gas and of a particular corrosion resistance depending upon the type of the generated gas. Furthermore, the outlet side of the connection device adjacent to the washing-absorption tower is always in moistured state by the splash of the washing-absorption liquid from the washing-absorption tower and the material of the connection device tends to be badly damaged by the splashing liquid. Thus, the connection devices which are at present available are formed of a metal such as Hastelloy (a heat-resisting nickel alloy manufactured by Hayness Stellite Co. in the United States of America) or corrosion-resisting brick. However, even when the connection device is formed of such materials, wear on the connections devices progresses repidly and the device can not be expected to have its required long service life.

In order to overcome the disadvantages inherent in the connection devices of the type referred to above, the flue conduit extending from a combustion furnace or reactor and a washing-absorption tower have been connected together by a connection device which concurrently serves as high temperature gas quenching means and which comprises a double-walled cylindrical structure including a porous inner cylinder and an impervious outer cylinder surrounding the inner cylinder in a peripherally spaced relationship to the inner cylinder so as to define a jacket into which a cooling liquid such as diluted hydrochloric acid which permeates through the inner porous cylinder is pumped to cool the flue gas passing through the connection device.

However, even when the flue conduit and washing-absorption tower are connected together by the double-walled connection device, since the cooling liquid pumped into the jacket evaporates violently upon contact with the flue gas passing through the inner porous cylinder and splashes back onto the refractory lining of the flue conduit to thereby cause spalling to occur resulting in shortening of the service life of the flue conduit. Especially when a high corrosive cooling liquid such as hydrochloric acid is employed as the cooling liquid, the cooling liquid entrained in the flue gas penetrates through the refractory lining to the outer metal sheath of the flue conduit to thereby erode the metal material of the outer sheath to the degree that holes will be formed in the outer metal sheath and in consequence, a section or sections of the refractory lining can not be held on the inner surface of the outer metal sheath and the lining sections will ultimately come off the outer sheath.

SUMMARY OF THE INVENTION

Therefore, one principal object of the present invention is to provide a novel and improved connection device for connecting the flue conduit extending from a combustion furnace or reactor and a washing-absorption tower and concurrently serving as high tempeature flue gas quenching means which can effectively eliminate the difficulties inherent in the conventional connection devices of the above type.

Another object of the present invention is to provide a novel and improved connection device for connecting the flue conduit extending from a combustion furnace or reactor and a washing-absorption tower and concurrently serving as high temperature flue gas quenching means which comprises a double-walled cylindrical structure including an inner porous cylinder and an outer impervious cylinder surrounding the inner cylinder in a peripherally spaced relationship to the inner cylinder to define a cooling liquid receiving jacket and annular porous barrier means which protects the refractory lining of the flue conduit against the effect of the cooling liquid.

According to the present invention, there has been provided a connection device for connecting the flue conduit extending from a combustion furnace or reactor and a washing-absorption tower and concurrently serving as high temperature flue gas quenching means which comprises a double-walled cylindrical structure including an inner porous cylinder and an outer impervious cylinder surrounding said inner cylinder in a peripherally spaced relationship to the inner cylinder to define a cooling liquid jacket therebetween, cooling liquid inlet means in said outer impervious cylinder for directing cooling liquid into said jacket, annular porous barrier means disposed between said flue conduit and double-walled cylindrical structure for protecting said flue conduit against the effect of said cooling liquid and inert gas inlet means adjacent to said barrier means for directing inert gas through said barrier means.

The above and other objects and attendant advantages of the present invention will be more readily apparent to those skilled in the art from a reading of the following detailed description in conjunction with the accompanying drawing which shows the invention for illustration purpose only, but not for limiting the scope of the same in any way.

BRIEF DESCRIPTION OF THE DRAWING

FIG. 1 is a schematic view of a system in which a preferred form of a connection device of the invention which concurrently serves as quenching means is provided between a combustion furnace or reactor and a washing-absorption tower; and FIG. 2 is a cross-sectional view in cross-section on an enlarged scale of said connection device of FIG. 1.

PREFERRED EMBODIMENT OF THE INVENTION

The present invention will be now described referring to the accompanying drawing which illustrates a system in which the connection device of the invention which concurrently serves as flue gas quenching means is employed between a combustion furnace or reactor and a washing-absorption tower for connecting between the rnace and tower. In the drawing, and more particularly, in FIG. 1 thereof reference numeral 1 denotes a combustion furnace or reactor which has a refractory-lined conduit 2 connected at one end to the bottom of the furnace. The flue conduit 2 comprises an inner refractory lining 3 and a coaxial outer iron sheath 4 surrounding the refractory lining (FIG. 2). The other end of the flue conduit 2 is connected to one end of a connection device 5 which concurrently serves as flue gas quenching means and which constitues the subject matter of the invention. The construction of the connection device will be described in detail hereinafter referring to FIG. 2. The other end of the connection device 5 is connected to the inlet 6' of a washing-absorption tower 6. Since the combustion furnace or reactor 1, flue conduit 2 and washing-absorption tower 6 are of conventional design and do not constitute any part of the invention, detailed description of these conventional devices will be eliminated herein.

Referring now to FIG. 2 of the accompanying drawing which shows the connection device of the invention which concurrently serves as flue gas quenching means in cross-section on an enlarged scale. The connection device 5 generally comprises a double-walled cylindrical structure which includes an inner porous carbon cylinder 7 and a coaxial outer impervious carbon cylinder 8 surrounding the inner cylinder 7 in a peripherally spaced relationship to a substantial portion of the inner cylinder to thereby define an annular space or jacket 9 therebetween. As shown in FIG. 2, the inner cylinder 7 converges towards the right-hand end or outlet (as seen in FIG. 2) adjacent to the washing-absorption tower 6. The left-hand end (as seen in FIG. 2) of the inner porous cylinder 7 terminates short of the adjacent end of the outer cylinder 8 so as to define a space 5' there. The top of the outer cylinder 8 is provided adjacent to the right-hand end (as seen in FIG. 2) with fluid inlet means 10 through which water, acidic or alkaline solution or organic solvent such as methanol from a suitable source of such fluid (not shown) can be pumped into the jacket 9 for the purpose to be described hereinafter. Coaxially interposed between the adjacent ends of the flue conduit 2 and connection device 5 is barrier means in the form of an annular plate member 11 formed of a water-proof porous material and the barrier means has a center bore which communicates between the flue conduit and connection device. An annular iron sleeve 12 is coaxially disposed around the annular plate member or barrier means 11 in a peripherally spaced relationship to the plate member to thereby define an annular jacket 13 therebetween and the top of the annular sleeve 12 is provided with inert gas inlet means 14 through which inert gas such as nitrogen or carbonic acid gas from a suitable inert gas source (not shown) is pumped into the annular jacket 13. The annular sleeve 12 has a flange 12' at the left-hand end (as seen in FIG. 2) which is secured to a flange 16 integrally formed with or otherwise secured to the flue conduit 2. When pumped through the inlet means 14 into the jacket 13, the inert gas infiltrates from the outer periphery of the annular porous plate member 11 through the porous texture of the plate member towards the center of the plate member and then passes through the space 5' into the inner porous cylinder 7. As the inert gas passes through the annular porous plate member 11, the inert gas effectively cools the plate member and at the same time, protects the plate member against wear due to oxidation thereof. As seen in FIG. 2, the right-hand end of the annular sleeve 12 is bent into U-shape to provide annular flange 12" at the extreme end of the bent portion to be secured to the connection device 5 by means of suitable fastening means (not shown). Reference numeral 15 denotes a packing land disposed between the outer cylinder 8 and annular sleeve 12 so as to seal between the two parts against leakage of the inert gas therethrough. A flange 17 is integrally formed with or otherwise secured to the outer cylinder 8 and suitable fastening means (not shown) extend through the flange 16 and 17 to connect the flanges together and in consequence, the flue conduit 2 and connection device 5 together. The right-hand end or discharge end wall of the outer cylinder 8 is provided with a through opening 8' in which the outlet of the inner cylinder 7 is disposed. The outlet of the cylinder 7 is in communication with the inlet 6' (shown by the phantom lines in FIG. 2) of the washing-absorption tower 6.

In operation, the gas generated in the combustion furnace 1 is discharged into the flue conduit 2 at a high temperature and simultaneously, an inert gas such as nitrogen or carbonic acid gas is pumped through the inlet means 14 and the gas permeates through the porous texture of the annular plate member 11 and then passes into the interior of the inner cylinder 7 via the space 5'. As the inert gas permeates through the annular porous plate member 11, the inert gas cools and protects the plate member against wear due to its oxidation. The high temperature gas then passes through the flue conduit 2 into the inner porous cylinder 7 and at the same time, a cooling liquid such as water, acidic or alkaline solution or organic solvent such as methanol is pumped through the fluid inlet means 10 into the jacket 9 defined between the inner and outer cylinders 7 and 8 to fill the jacket. The cooling liquid then permeates through the porous exture of the inner cylinder 7 to pass into the interior of the cylinder whereupon the cooling liquid evaporates by its contact with the high temperature flue gas passing through the interior of the inner cylinder 7.

The evaporation of the cooling liquid reduces the temperature of the high temperature flue gas and at the same time, reduces the temperature of the inner surface of the inner cylinder 7. The reduced temperature flue gas then passes through the outlet of the inner sylinder 7 into the inlet 6' of the washing-absorption tower 6 where the flue gas is deprived of its harmful ingredients as the flue gas goes up through the tower in the conventional manner.

In this way, according to the present invention, having passed through the flue conduit 2, the flue gas is effectively cooled by the cooling liquid as the flue gas passes through the inner cylinder 7 and the temperature of the flue gas is reduced to a temperature suitable for the washing-absorption operation in the tower before the flue gas reaches the tower 6. Although the cooling liquid evaporates violently from the inner surface of the cylinder 7 upon its contact with the flue gas passing through the inner cylinder 7, the vapor from such evaporation is prevented from passing into the flue conduit 2 by the presence of the water-proof barrier means or annular plate member 11 whereby the refractory lining 3 of the flue conduit 2 is protected against the effect of the vapor to thereby ensure a prolonged service life of the flue conduit and more particularly, the refractory lining 3 thereof. Therefore, even if hydrochloric acid solution which is highly corrosive is employed as the cooling liquid, the refractory lining 3 of the flue conduit 2 is effectively protected against the oxidation effect of such a highly corrosive cooling liquid.

Assuming that an organic chloride is burned in the combustion furnace 1, for example, the gas discharged from the furnace passes through the flue conduit 2 at a high temperature of about 1050°C and when the flue gas is cooled with a cooling liquid which permeates through the inner porous cylinder 7 and has a temperature from 100° to 110°C, the flue gas is cooled to a temperature from 450° to 500°C before the flue gas is discharged into the washing-absorption tower 6. After the reduced temperature flue gas has been discharged into the inlet 6' of the washing-absorption tower 6, the splashed particles of the cooling fluid evaporate to deprive the flue gas of its heat whereby the temperature of the flue gas is further reduced.

While only one preferred embodiment of the invention has been shown and described, it will be understood that there is no intention to limit the invention by such disclosure, by rather it is intended to cover all modifications and alternate arrangements falling within the spirit and scope of the invention as defined in the appended claims.

What is claimed is:

1. A connection device for connecting between the flue conduit extending from a combustion furnace and a washing-absorption tower and concurrently serving as high temperature flue gas quenching means, comprising a double-walled cylindrical structure including an inner porous cylinder and an outer impervious cylinder surrounding said inner cylinder in a peripherally spaced relationship to said inner cylinder to define a cooling liquid jacket therebetween; cooling liquid inlet means in said outer impervious cylinder for directing cooling liquid into said jacket; an annular porous barrier means disposed between said flue conduit and double-walled cylindrical structure for protecting said flue conduit against the effect of said cooling liquid; and inert gas inlet means adjacent to said barrier means, for directing inert gas through said barrier means.

2. The connection device as set forth in claim 1, in which said inner porous cylinder is formed of porous carbon and said outer cylinder is formed of impervious carbon.

3. The connection device as set forth in claim 1, in which said barrier means comprises an annular water-proof porous plate member surrounded by an annular iron sleeve which encloses said plate member in a peripherally spaced relationship to the plate member and has said inert gas inlet means.

4. The connection device as set forth in claim 3, in which an annular inert gas receiving jacket is defined between said annular water-proof porous inner plate member and said annular iron sleeve.

5. The connection device as set forth in claim 1, in which said cooling liquid inlet means is provided in the top wall of said impervious outer cylinder.

6. The connection device as set forth in claim 1, in which said cooling liquid is water.

7. The connection device as set forth in claim 1, in which said cooling liquid is acidic solution.

8. The connection device as set forth in claim 1, in which said cooling liquid is alkaline solution.

9. The connection device as set forth in claim 1, in which said cooling liquid is organic solvent.

10. The connection device as set forth in claim 1, in which said organic solvent is methanol.

11. The connection device as set forth in claim 1, in which said inert gas is nitrogen.

12. The connection device as set forth in claim 1, in which said inert gas is carbonic acid gas.

13. The connection device as set forth in claim 1, in which said water-proof porous plate member has a center opening through which said flue conduit and inner porous cylinder are communicated with each other.

* * * * *